R. BALL.
Improvement in Hay and Cotton Presses.
No. 4,995. Reissued July 23, 1872.
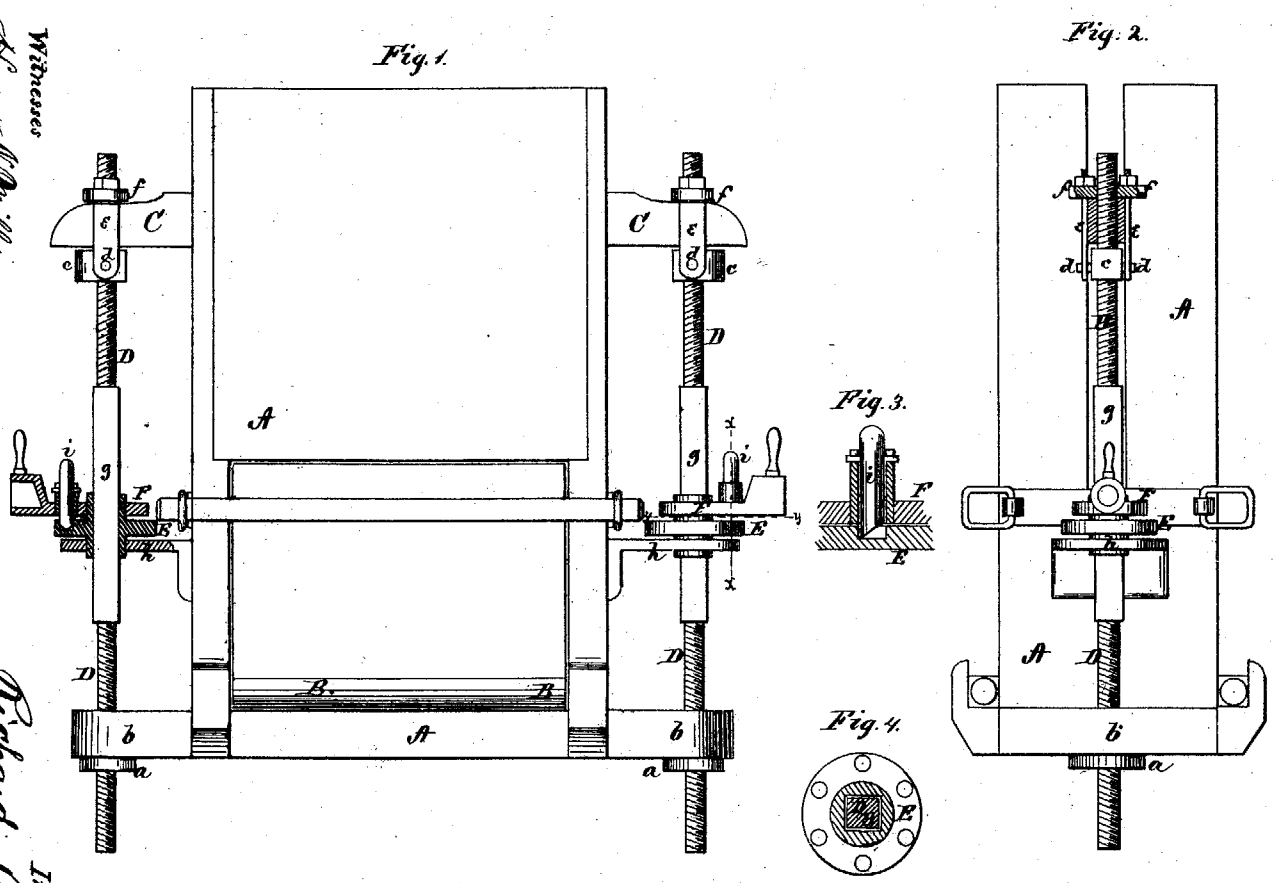
Witnesses
Henry N. Miller
C. L. Ewert.
Inventor
Richard Ball
per Alexander Mason
Attorneys.
AM. PHOTO-LITHOGRAPHIC CO. N.Y. (OSBORNE'S PROCESS.)

UNITED STATES PATENT OFFICE.

RICHARD BALL, OF PETERSBURG, VIRGINIA, ASSIGNOR TO WM. H. TAPPEY, WM. C. LUMSDEN, AND ALEXANDER STEEL.

IMPROVEMENT IN HAY AND COTTON PRESSES.

Specification forming part of Letters Patent No. 104,689, dated June 28, 1870; reissue No. 4,995, dated July 23, 1872.

*To all whom it may concern:*

Be it known that I, RICHARD BALL, of Petersburg, in the county of Dinwiddie and State of Virginia, have invented certain new and useful Improvements in "Hay and Cotton Presses;" and do hereby declare the following to be a full, clear, and exact description thereof, reference being had to the accompanying drawing and to the letters of reference marked thereon.

The nature of my invention consists in the construction and arrangement of devices for operating the follower of a hay and cotton press, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a side elevation of my improved hay and cotton press. Fig. 2 is an end view of the same. Fig. 3 is a detail transverse section on an enlarged scale taken on the plane of the line *x x*, Fig. 1. Fig. 4 is a detail horizontal section taken on the plane of the line *y y*, Fig. 1.

A in the drawing represents the frame of the press. B is the fixed bottom; C, the follower. The ends of the follower project through the slotted sides of the press. D D are two right-and-left screws, which are, with their lower parts, fitted through nuts *a a*, that are firmly secured in the bed *b* of the press. The screws are held in a vertical position near to the ends of the machine. The upper end of each screw is passed through a nut, *c*, which is, by means of pins *d*, pivoted to arms *e*, which are suspended from a plate, *f*, that rests upon the end of the follower. The plate *f* is perforated, and embraces the screw, to be held in place by the same. When one screw is revolved it will work in both nuts *a* and *c* to raise or lower the follower; and if one screw should be turned quicker than the other, to set the follower into a somewhat inclined position, such derangement will not prove injurious to any of the parts, as the pivoted nuts will swing in accordance with the changed angle of the follower. If the nuts were rigidly attached to the follower they would be strained and destroyed when the screws were unevenly used. If the power applied could be so regulated that the screws would turn evenly, then, of course, the nuts may be rigidly attached to or in the follower; but as this requires more care and attention than is usually bestowed in pressing hay and cotton, I deem it better to use the swinging nuts, as above described. Between the right-and-left-hand screw-threads there is on each screw D a square portion, *g*, which receives a loose collar, E, that can slide on the screw, or rather let the latter slide in it, the collar being supported by a plate, *h*, that projects from the press. Upon the collar rests a plate, F, which carries a spring-pawl, *i*, with a beveled working end. The end of the pawl works in the notched surface of the collar. When a lever is secured to a projecting socket of the plate F and oscillated, it will cause the pawl to turn the collar and screw in one direction and to slip in the other. By reversing the position of the pawl in its socket the action of the lever may also be reversed. Any other equivalent apparatus may, however, be employed for turning the screws.

Having thus fully described my invention, what I claim as new, and desire to secure by Letters Patent, is—

1. In combination with right-and-left screws for operating the follower of a press, I claim pivoted or swinging nuts attached to said follower, and through which the screws pass, substantially as and for the purposes herein set forth.

2. The right-and-left screw-rods D, combined with nuts *a* fixed to a bed, *b*, nuts *c* swinging in arms *e*, and perforated plates *f* resting upon the follower, all relatively arranged as and for the purpose specified.

3. The right-and-left screw-rods D having square middle *g*, combined with loose collars E and supports *h*, all constructed and relatively arranged on a press as shown and described.

4. The combination of pawl-plates F *i* and loose collars E, both resting upon a support, *h*, and surrounding the square middle of right-and-left screws, to rotate the latter and actuate a press, in the manner described.

In testimony that I claim the foregoing I have hereunto set my hand and seal this 28th day of May, 1872.

RICHARD BALL. [L. S.]

Witnesses:
J. H. SMITH,
D. A. WEIRIGER.